(12) United States Patent
Konishi

(10) Patent No.: US 9,178,977 B2
(45) Date of Patent: Nov. 3, 2015

(54) COMMUNICATION TERMINAL

(75) Inventor: Yu Konishi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 590 days.

(21) Appl. No.: 13/492,603

(22) Filed: Jun. 8, 2012

(65) Prior Publication Data

US 2012/0315887 A1    Dec. 13, 2012

(30) Foreign Application Priority Data

Jun. 10, 2011   (JP) .................................. 2011-130154

(51) Int. Cl.
    *H04M 3/00*    (2006.01)
    *H04M 1/725*   (2006.01)
(52) U.S. Cl.
    CPC ...... *H04M 1/72533* (2013.01); *H04M 2250/22* (2013.01)
(58) Field of Classification Search
    None
    See application file for complete search history.

(56) References Cited

U.S. PATENT DOCUMENTS 7,199,787 B2 *  4/2007  Lee et al. ...................... 345/169
7,289,772 B1 * 10/2007  Bonansea et al. ............... 455/73

2003/0222856 A1 * 12/2003  Fedorak et al. ............... 345/173
2007/0091167 A1    4/2007  Shiina et al.
2007/0123309 A1    5/2007  Sano et al.

FOREIGN PATENT DOCUMENTS

JP    2007-123962 A    5/2007
JP    2007-151014 A    6/2007
JP    2010-165289 A    7/2010

* cited by examiner

*Primary Examiner* — German J Viana di Prisco
(74) *Attorney, Agent, or Firm* — Studebaker & Brackett PC

(57) ABSTRACT

A communication terminal includes: a touch panel, which receives a contact operation and outputs position information representing the contact position, and which includes a first operation area configured to receive a position designating operation and a second operation area configured to receive a response operation to respond to an event occurring according to an execution of another function; a control unit, which determines whether the position information represents the first operation area or the second operation area, wherein, in a case where the position information represents the first operation area, the control unit outputs the received position information to the transmitting unit, and wherein, in a case where the position information represents the second operation area and the notification signal is received, the control unit controls to perform a process corresponding to a notification signal.

5 Claims, 5 Drawing Sheets

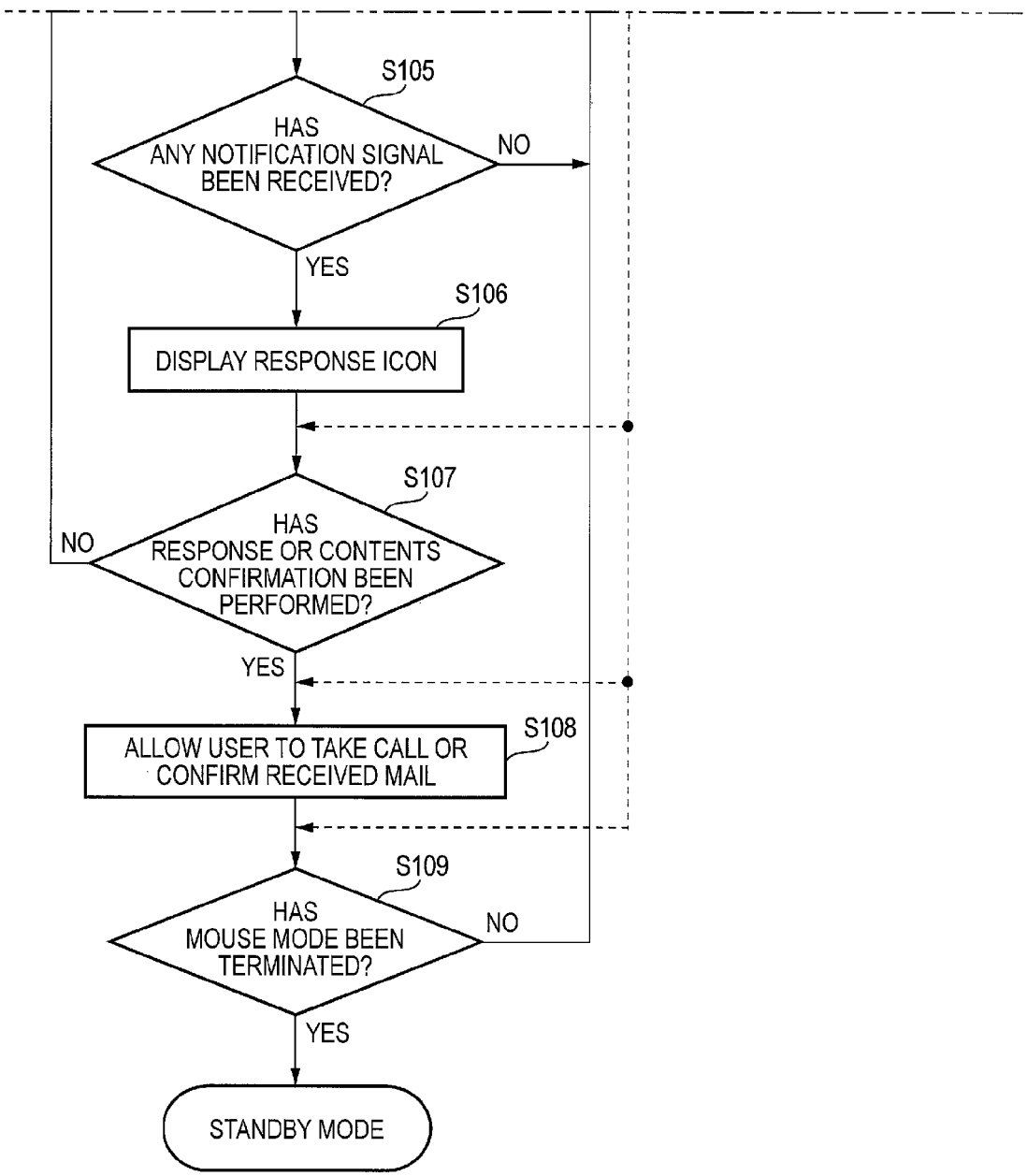

COMMUNICATION TERMINAL

CROSS-REFERENCE TO RELATED APPLICATION

This application claims priority from Japanese Patent Application No. 2011-130154 filed on Jun. 10, 2011, the entire subject matter of which is incorporated herein by reference.

TECHNICAL FIELD

This disclosure relates to a communication terminal having a function of designating a position on a screen of an external display device.

BACKGROUND

A portable phone has various functions in addition to a telephone function. Examples of those functions include an electronic mail function of transmitting and receiving electronic mails, a game function of executing games according to game programs, a digital camera function, and a television function of receiving and displaying television broadcasts. Also, in order to improve operability, there are portable phones having a main operation unit which includes a display device such as a liquid crystal display, and a touch pad that is attached to a display face of the display device and receives user's contact operation.

JP-A-2010-165289 discloses a portable phone which can be communicably connected to an external display device such as a television receiver so as to enable enlarged display of predetermined display information from the portable phone on the external display device, and then a portable phone can be used as an input device such as a mouse. This portable phone includes a light source, a lens, and an image sensor, and can be moved in arbitrary directions on a working face of a desk or the like. The light source emits light from the inside of a casing of the portable phone toward the working face. The lens condenses the light reflected by the working face. The image sensor detects the condensed light. According to the result of the detection of the image sensor, the portable phone obtains a movement direction and movement distance of the portable phone, and outputs the movement direction and the movement distance to the external display device.

JP-A-2007-123962 discloses a portable phone having a wireless mouse function. This portable phone calculates a movement direction and movement distance of the portable phone based on a displacement between images acquired by a built-in camera unit, and transmits the movement direction and the movement distance to a personal computer through a short-distance wireless communication unit. The personal computer controls movement and display of a pointer displayed on a monitor unit, based on the movement direction and the movement distance received from the portable phone.

SUMMARY

As described above, a portable phone has various functions in addition to the telephone function. For example, according to JP-A-2007-151014, when a call is received while a game is being executed, YES indication and NO indication representing whether to take the call will be popped up to overlap a display area where a game image is being displayed. When a user selects the NO indication, the game restarts. Meanwhile, when the user selects the YES indication, the game stops, and the user can take the call.

However, in a portable phone having a function of designating a position on a screen of an external display device by using a main operation unit which includes a display device and a touch pad configured to receive user's contact operation, that is to say a mouse operation function, in a case where a call is received while a user performing mouse operation, even when YES indication and NO indication representing whether to take the call is popped up as disclosed in JP-A-2007-151014, since the user is generally watching the screen of the external display device, the user is likely to be unaware of the pop-up displayed at the portable phone. Therefore, even when the user intends performing the mouse operation, the portable phone receives response operation relative to the YES indication of the pop-up, for instance. In this case, there is a problem in which the mouse operation stops and an operation unintended by the user is performed.

Accordingly, this disclosure provides at least a communication terminal capable of suppressing incorrect operation, in a case where the function of designating the position is being used, even when an event which needs to be notified to the user occurs according to execution of a function other than a function of designating a position on a screen of an external display device.

In view of the above, a communication terminal of this disclosure having a function of designating a position on a screen of an external display device, comprises: a touch panel, which receives a contact operation and outputs position information representing the contact position, and which includes a first operation area configured to receive a position designating operation and a second operation area configured to receive a response operation to respond to an event occurring according to an execution of another function; a detecting unit, which detects occurrence of the event and outputs a notification signal; a control unit, which determines whether the position information represents the first operation area or the second operation area, a transmitting unit, which receives the position information and transmits the received position information to the transmitting unit; and a processing unit, which performs a process corresponding to the notification signal, wherein, in a case where the position information represents the first operation area, the control unit outputs the received position information to the transmitting unit, and wherein, in a case where the position information represents the second operation area and the notification signal is received, the control unit controls to perform a process corresponding to the notification signal.

According to the configuration, in the case where occurrence of the event is detected and the position information output from the touch panel represents the second operation area configured to receive a response operation to respond to the event having occurred, not the first operation area configured to receive position designating operation, the operation corresponding to the notification signal is performed. Therefore, it is possible to suppress incorrect operation.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Illustrative Embodiment

A portable phone 100 will be described as an illustrative embodiment of this disclosure. The portable phone 100 as a communication terminal is configured to be capable of transmitting and receiving calls or electronic mails to and from another portable phone through a base station and a portable phone network (not shown), and the portable phone 100 is also configured to be capable of transmitting and receiving calls or electronic mails to and from another portable phone or a personal computer through a base station, a portable phone network, and the Internet.

Figure 1:
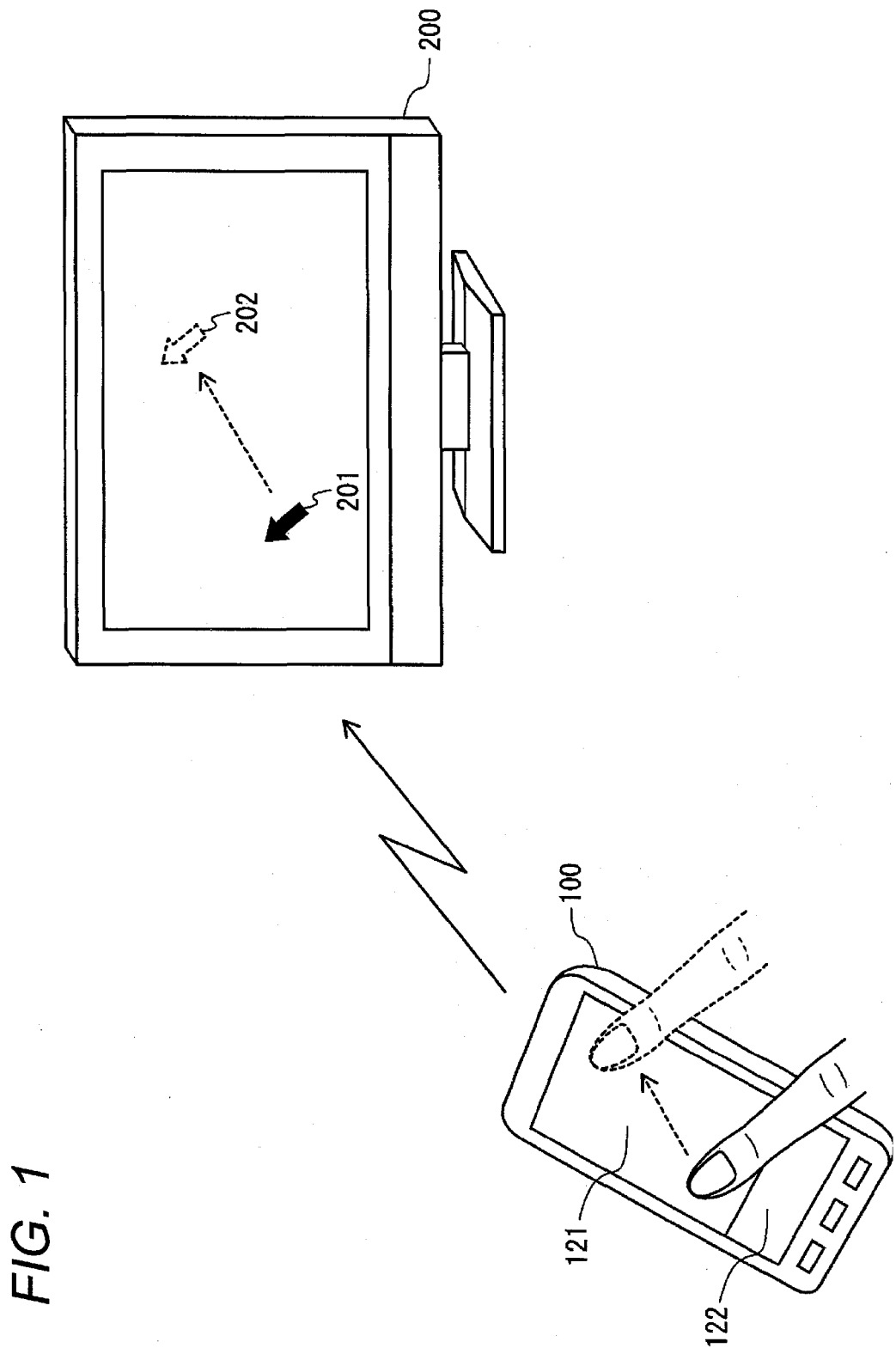
FIG. 1 is a schematic view illustrating an outline of a system in which a portable phone according to an illustrative embodiment of this disclosure can be connected to an external display device, to be usable as a pointing device.

Also, as shown in FIG. 1, the portable phone 100 is connected to an external display device 200 in a short-distance wireless way, so as to be usable as a mouse being a pointing device for the external display device 200.

A user can move an icon (a cursor having an arrow shape) 201 displayed on a screen of the external display device 200 to a position 202 by sliding the tip of a finger or the like on a mouse operation area 121 provided to a touch panel 106 of the portable phone 100 while keeping the tip of the finger or the like in contact with the mouse operation area 121. The movement direction and movement distance of the icon 201 are determined according to the movement direction and movement distance of the tip of the finger or the like moving on the mouse operation area 121 while being kept in contact with the mouse operation area 121.

1. Configuration of Portable Phone 100

Figure 2:
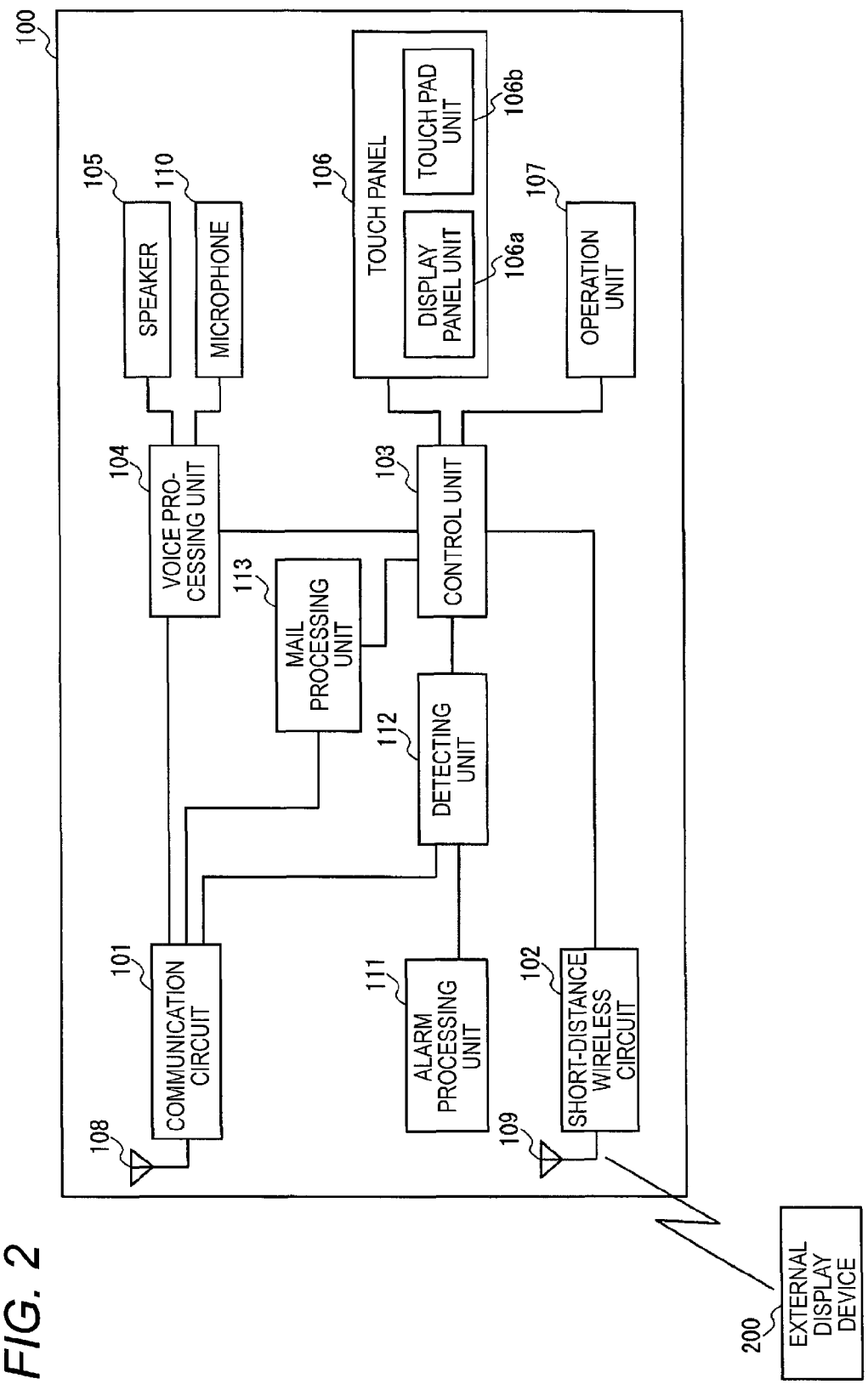
FIG. 2 is a block diagram illustrating a configuration of the portable phone 100.

As shown in FIG. 2, the portable phone 100 includes a communication circuit 101, a short-distance wireless circuit 102, a control unit 103, a voice processing unit 104, a speaker 105, a operation unit 107, the touch panel 106, an antenna 108, another antenna 109, a microphone 110, an alarm processing unit 111, a detecting unit 112, and a mail processing unit 113.

(1) Touch Panel 106

Figure 3:
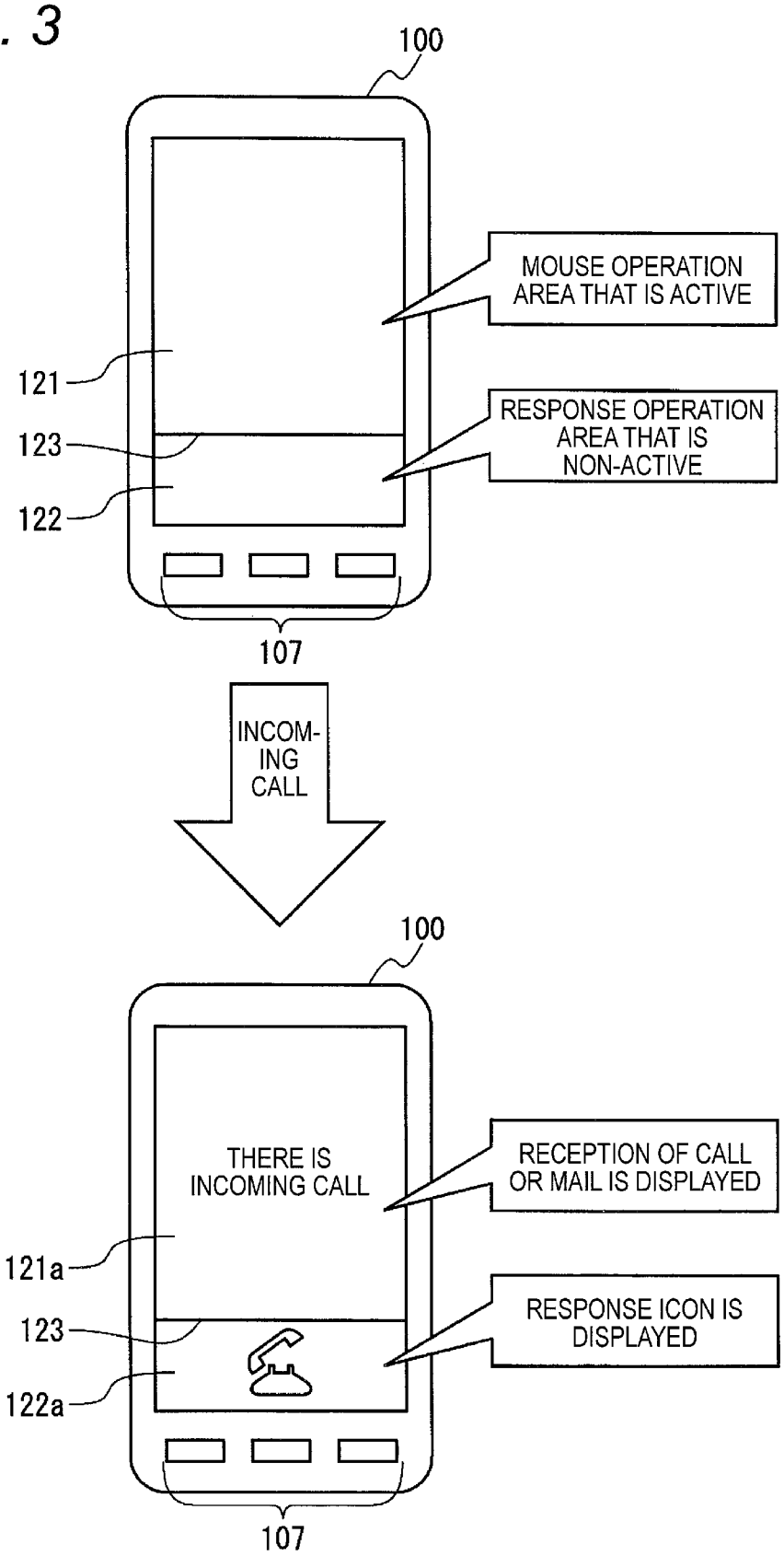
FIG. 3 is a view illustrating an example of a mouse operation area 121 and a response operation area 122 in the portable phone 100.

For example, the touch panel 106 is configured by a display panel unit 106a such as a liquid crystal display, and a touch pad unit 106b that is attached to a display face of the display panel unit 106a. Also, in a case where the portable phone 100 is used as a mouse being a pointing device, as shown as an example at the upper portion of FIG. 3, the touch panel 106 has a mouse operation area 121 and a response operation area 122.

In the case where the portable phone 100 is used as a mouse, the mouse operation area 121 is an area configured to receive position designating operation, and the response operation area 122 is an area configured to receive a response operation to respond to an event, which occurs according to an execution of a function other than the position designating function when the position designating operation is being performed, and needs to be notified to the user.

Between the mouse operation area 121 and the response operation area 122, a boundary line 123 may be displayed for distinguishing between the mouse operation area 121 and the response operation area 122. In order to distinguish between the mouse operation area 121 and the response operation area 122, the mouse operation area 121 and the response operation area 122 may be displayed in other colors or other gray levels.

When the user brings the tip of a finger or the like into contact with the touch pad unit 106b, at a predetermined time interval, for example, every 50 ms, the touch pad unit 106b detects the contact position, generates position information (an x coordinate value and a y coordinate value) representing the contact position, and outputs the generated position information to the control unit 103. When the user slide the tip of the finger or the like on the touch pad unit 106b while keeping the tip of the finger or the like in contact with the touch pad unit 106b, the touch pad unit 106b continuously detects the contact position of the tip of the finger or the like, continuously generates position information (an x coordinate value and a y coordinate value) representing the contact position, and continuously outputs the position information to the control unit 103.

The display panel unit 106a receives a message and position data representing a display position from the control unit 103 and then displays the received message at the position represented by the received position data.

For example, the display panel unit 106a receives position data representing the mouse operation area 121, and a message such as 'THERE IS INCOMING CALL' from the control unit 103, and may display the message 'THERE IS INCOMING CALL' at the mouse operation area 121 represented by the received position data. At the lower portion of FIG. 3, there is shown an example 121a in which a message 'THERE IS INCOMING CALL' is displayed at the mouse operation area 121. As other message examples, there are a message such as 'THERE IS INCOMING E-MAIL', a message such as 'SET TIME HAS COME', and the like. Here, the message 'THERE IS INCOMING CALL' represents an incoming call, the message 'THERE IS INCOMING E-MAIL' represents an incoming electronic mail, and the message 'SET TIME HAS COME' represents a time set by the user. Also, the message 'THERE IS INCOMING CALL' may be accompanied with display of the phone number of the other party of the call, and the message 'THERE IS INCOMING E-MAIL' may be accompanied with the address of the sender of the electronic mail. The message 'SET TIME HAS COME' may be accompanied with the set time.

Also, for example, the display panel unit 106a receives position data representing the response operation area 122 and display data representing a response icon from the control unit 103, and then displays the response icon represented by the display data, at the response operation area 122 which is represented by the received position data. At the lower portion of FIG. 3, there is shown an example 122a in which the response icon represented by the display data is displayed at the response operation area 122. The icon displayed at the response operation area 122 is not limited to the response icon. Another icon such as an icon representing reception of an electronic mail or an icon representing coming of a set time may be displayed.

Also, the touch panel 106 receives the contents of an electronic mail from the mail processing unit 113 through the control unit 103, and displays the received contents of the electronic mail.

(2) Antenna 108 and Communication Circuit 101

The antenna 108 transmits and receives radio signals to and from the base station (not shown) through a wireless line.

The communication circuit 101 performs frequency selection or frequency conversion of radio signals received or to be transmitted by the antenna 108. When there is an incoming call, the communication circuit 101 outputs a call reception signal representing the reception of the call, to the detecting unit 112. Meanwhile, when there is an incoming electronic mail, the communication circuit 101 outputs a mail reception signal representing the reception of the electronic mail, to the detecting unit 112.

(3) Alarm Processing Unit 111

The alarm processing unit 111 sets an alarm set time according to user's operation, and monitors coming of the set alarm set time.

In a normal case, that is, a case where the portable phone 100 is not in a mode in which the portable phone 100 is used as a mouse being a pointing device, when the set alarm set time comes, the alarm processing unit 111 emits an alarm sound.

Meanwhile, in a case where the portable phone 100 is set in the mode in which the portable phone 100 is used as a mouse being a pointing device, the alarm processing unit 111 monitors coming of the set alarm clock time. When the set alarm clock time comes, the alarm processing unit 111 outputs an alarm signal to the detecting unit 112. Also, in a case where the user responds to the response icon, the alarm processing unit 111 emits an alarm sound according to the control of the control unit 103.

(4) Detecting Unit 112

The detecting unit 112 detects occurrence of an event, which needs to be notified to the user, of a call function, an e-mail transmitting/receiving function, an alarm function, or the like. Here, specific examples of the event include a reception of a call, a reception of an electronic mail, and coming of an alarm set time. Specifically, the detecting unit 112 receives a call reception signal representing reception of a call or a mail reception signal representing reception of an electronic mail, from the communication circuit 101, or receives an alarm signal representing coming of the set time from the alarm processing unit 111, thereby detecting the occurrence of the event. When receiving the call reception signal, the mail reception signal, or the alarm sound, the detecting unit 112 outputs a notification signal representing the reception of the corresponding signal, to the control unit 103. Here, the notification signal also represents whether the factor of the occurrence of the event is reception of a call, reception of an electronic mail, or coming of the alarm set time.

(5) Control Unit 103

(In a Case of Reception of Setting, and Reception of Position Information and Notification Signal)

The control unit 103 receives a setting of the mode in which the portable phone 100 is used as a mouse being a pointing device, or receives a setting of termination of the mode in which the portable phone 100 is used as a mouse, by user's operation.

Also, in a time period when the tip of the finger or the like of the user is in contact with the touch pad unit 106b, the control unit 103 receives the position information (the x coordinate value and the y coordinate value) representing the contact position of the tip of the finger or the like, from the touch panel 106 at the predetermined time interval, for example, at every 50 ms. Further, the control unit 103 receives the notification signal from the detecting unit 112.

(In Case of a Portable Phone Used as Mouse)

In a case where the portable phone 100 is set in the mode, in which the portable phone 100 is used as a mouse being a pointing device by user's operation, when receiving the position information (the x coordinate value and the y coordinate value) from the touch panel 106, the control unit 103 determines whether the received position information represents the mouse operation area 121 or the response operation area 122. Specifically, each of the mouse operation area 121 and the response operation area 122 is a rectangular area, and the control unit 103 stores the coordinate values of the top left point and bottom right point of the mouse operation area 121 and the response operation area 122, respectively. Then, the coordinate values representing the positions of the mouse operation area and the response operation area 122 is used to determine whether the position represented by the position information received from the touch panel 106 exists in the mouse operation area 121 or in the response operation area 122.

In a case where the position information received from the touch panel 106 represents the mouse operation area 121, the control unit 103 outputs the received position information to the transmitting unit 200 through the short-distance wireless circuit 102 and the antenna 109.

Meanwhile, in a case where the position information received from the touch panel 106 represents the outside of the mouse operation area 121, in other words, a case where the received position information represents the response operation area 122, the control unit 103 invalidates the received position information, without outputting the received position information to the short-distance wireless circuit 102.

(When the Notification Signal is Received in a Case where the Portable Phone is Used as Mouse)

In a case where the portable phone 100 is set in the mode in which the portable phone 100 is used as a mouse, when receiving the notification signal from the detecting unit 112, the control unit 103 outputs a message representing the occurrence of the event which is the factor of the occurrence of the received notification signal, and position data representing the mouse operation area 121, to the touch panel 106, and then the control unit 103 controls the touch panel 106 so that the touch panel 106 displays the massage in the area represented by the position data. Here, the content is a message such as 'THERE IS INCOMING CALL' when there is an incoming call, a message such as 'THERE IS INCOMING MAIL' when there is a received electronic mail, and a message such as 'SET TIME HAS COME' when the alarm set time has come.

Also, in a case where the portable phone 100 is set in the mode in which the portable phone 100 is used as a mouse, when receiving the notification signal from the detecting unit 112, the control unit 103 outputs the position data representing the response operation area 122, and the display data representing the response icon, to the touch panel 106, and then the control unit 103 controls the touch panel 106 so that the touch panel 106 displays the display data in the area represented by the position data.

Here, even when the event which is the factor of the occurrence of the notification signal is any one of reception of a call, reception of an electronic mail, and coming of the alarm set time, the control unit 103 uniformly outputs the display data representing the response icon and controls the touch panel 106 so that the touch panel 106 displays the response icon. Alternatively, the control unit 103 may control the touch panel 106 so that the touch panel 106 displays an icon depending on the event which is the factor of the occurrence of the notification signal.

(Case where Response Icon is Displayed in Response Operation Area 122)

In a state where the response icon is displayed in the response operation area 122, when receiving the position information (the x coordinate value and the y coordinate value) from the touch panel 106, the control unit 103 determines whether the received position information represents the mouse operation area 121 or the response operation area 122 as described above.

In a case where the position information received from the touch panel 106 represents the mouse operation area 121, the control unit 103 outputs the received position information to the transmitting unit 200 through the short-distance wireless circuit 102 and the antenna 109 as described above.

Meanwhile, in a case where the position information received from the touch panel 106 represents the response operation area 122, the control unit 103 determines that the user responses to the reception of the call, the reception of the electronic mail, or the incoming of the alarm set time, and then the control unit 103 controls the voice processing unit 104, the mail processing unit 113, or the alarm processing unit 111 so that a corresponding process is performed, according to the notification signal.

(Other Control)

The control unit 103 performs other controls.

(6) Voice Processing Unit 104 and Mail Processing Unit 113

In the normal case, that is, the case where the portable phone 100 is not in the mode in which the portable phone 100 is used as a mouse being a pointing device, the voice processing unit 104 demodulates a voice signal received from the communication circuit 101 and outputs the demodulated signal as an audio signal to the speaker 105. Meanwhile, when an audio signal is input to the microphone 110, the audio signal is converted into an electric signal which is a voice signal. In this case, the voice processing unit 104 modulates the voice signal and transmits the modulated signal by the communication circuit 101.

In the case where the portable phone 100 is set in the mode in which the portable phone 100 is used as a mouse being a pointing device, when the user responds to the response icon, according to the control of the control unit 103, the voice processing unit 104 demodulates the voice signal received from the communication circuit 101, and outputs the demodulated signal as an audio signal to the speaker 105. Meanwhile, when an audio signal is input to the microphone 110, the audio signal is converted into an electric signal which is a voice signal. In this case, according to the control of the control unit 103, the voice processing unit 104 modulates the voice signal and transmits the modulated signal by the communication circuit 101.

In the normal case, that is, the case where the portable phone 100 is not in the mode in which the portable phone 100 is used as a mouse being a pointing device, the mail processing unit 113 receives the contents of an electronic mail and an input of a mail address which is the destination of the electronic mail, by the user, and transmits the received electronic mail to the received mail address. Also, when receiving an electronic mail from the communication circuit 101, the mail processing unit 113 outputs the contents of the electronic mail to the touch panel 106 through the control unit 103 so that the touch panel 106 displays the received electronic mail.

In the case where the portable phone 100 is set in the mode in which the portable phone 100 is used as a mouse being a pointing device, when the user responds to the response icon, the mail processing unit 113 receives the electronic mail from the communication circuit 101 according to the control of the control unit 103, and outputs the contents of the electronic mail to the touch panel 106 through the control unit 103 so that the touch panel 106 displays the received electronic mail.

(7) Antenna 109 and Short-Distance Wireless Circuit 102

For example, the antenna 109 transmits and receives radio signals to and from the external display device 200 through a wireless line of electric waves using a frequency band of 2.4 GHz. The short-distance wireless circuit 102 performs frequency selection, frequency conversion, or the like on a radio signal, which is received or to be transmitted through the antenna 109. The antenna 109 and the short-distance wireless circuit 102 receive the position information from the control unit 103 and wirelessly transmit the received position information to the transmitting unit 200.

The antenna 109 and the short-distance wireless circuit 102 may use Radio Frequency IDentification (RFID) in which a wireless communication distance is several tens cm.

The portable phone 100 may include an infrared communication unit in place of the antenna 109 and the short-distance wireless circuit 102. The infrared communication unit may use a standard of Infrared Data Association (IrDA) for short-distance data communication using an infrared ray. The infrared communication unit receives the position information from the control unit 103 and wirelessly transmits the received position information to the transmitting unit 200.

(8) Speaker 105, Microphone 110, and Operation Unit 107

The speaker 105 outputs audio such as a voice. The microphone 110 receives audio such as a voice. The operation unit 107 includes a power key for turning on or off the portable phone 100, a key for changing the volume of the speaker 105, and the like.

2. Operation of Portable Phone 100

Figure 4:
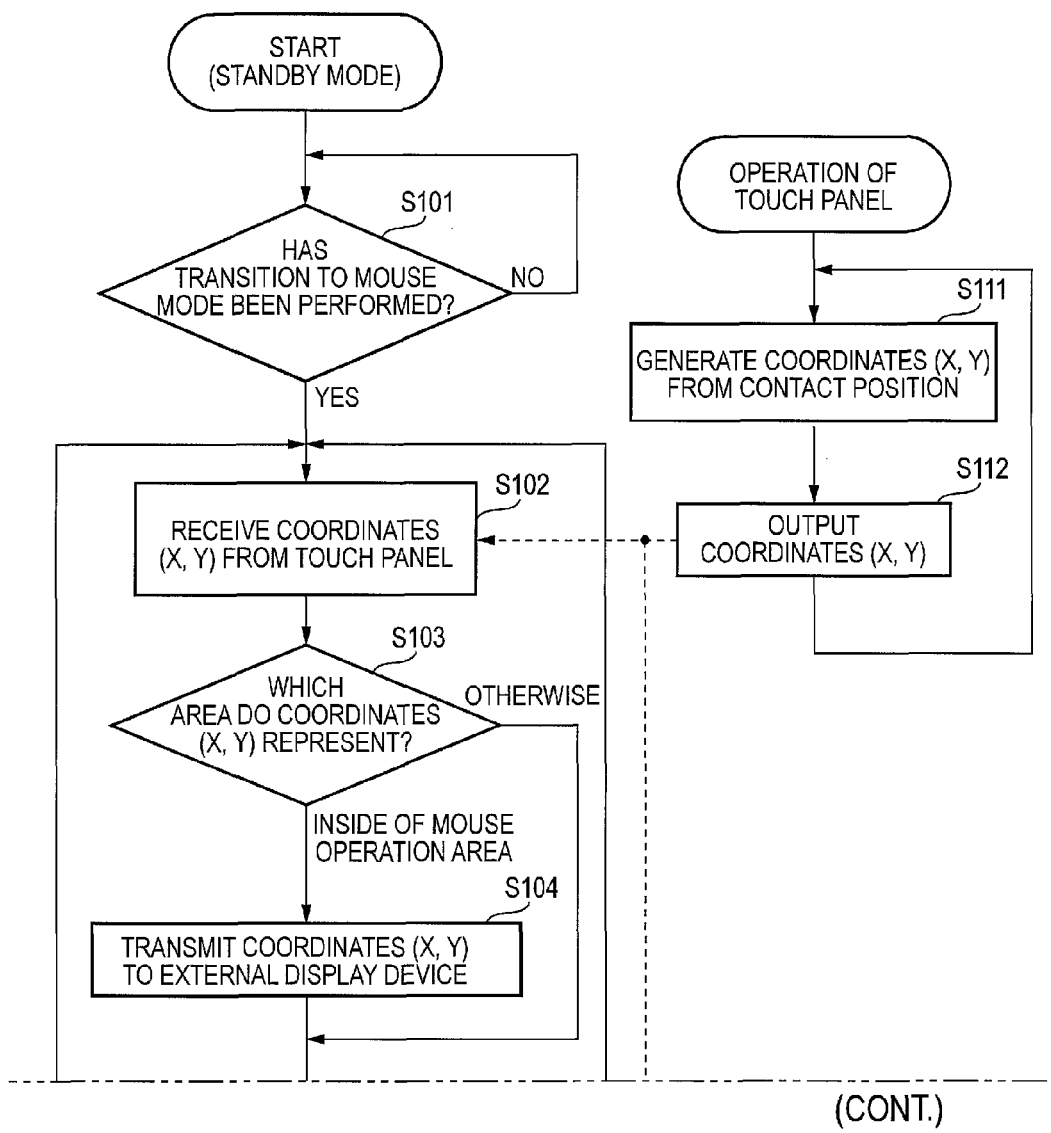
FIG. 4 is a flow chart illustrating a control operation of the portable phone 100.

An operation of the portable phone 100 will be described with reference to FIG. 4.

Hereinafter, the operation of the control unit 103 will be mainly described.

In step S101, the control unit 103 determines whether the portable phone 100 is set in the mode in which the portable phone 100 is used as a mouse being a pointing device.

In a case where the portable phone 100 is not set in the mode in which the portable phone 100 is used as a mouse (No in step S101), the control unit 103 returns to step S101 so as to repeat the determination.

In the case where the portable phone 100 is set in the mode in which the portable phone 100 is used as a mouse (Yes in step S101), in step S102, the control unit 103 receives the position information (the x coordinate value and the y coordinate value) representing the contact position of the tip of the user's finger or the like, from the touch panel 106.

Next, in step S103, the control unit 103 determines whether the received position information represents the mouse operation area 121 and the response operation area 122.

In the case where the position information received from the touch panel 106 represents the mouse operation area 121 ('INSIDE OF MOUSE OPERATION AREA' in step S103), in step S104, the control unit 103 outputs the received position information to the transmitting unit 200 through the short-distance wireless circuit 102 and the antenna 109. Meanwhile, in the case where the position information received from the touch panel 106 represents the outside of the mouse operation area 121 ('OTHERWISE' in step S103), the control unit 103 invalidates the received position information, without outputting the received position information to the short-distance wireless circuit 102.

When it is determined that a notification signal has received from the detecting unit 112 (Yes in step S105), in step S106, the control unit 103 controls the touch panel 106 so that the touch panel 106 displays a message representing occurrence of an event which is the factor of the occurrence of the received notification signal, and the response icon. Next, in step S107, the control unit 103 determines whether the position information received from the touch panel 106 represents the mouse operation area 121 or the response operation area 122. In a case where the position information represents the response operation area 122 (Yes in step S107), the control unit 103 determines that the user responses to reception of a call, reception of an electronic mail, or incoming of the alarm set time, and controls the voice processing unit 104, the mail processing unit 113, or the alarm processing unit 111 so that a corresponding process is performed, according to the notification signal.

Next, in a case where it is determined that the setting of the mode in which the portable phone 100 is used as a mouse has not been terminated (No in step S109), the control unit 103 returns to step S102 to repeat the processes. Meanwhile, in a case where it is determined that the setting of the mode in which the portable phone 100 is used as a mouse has been terminated (Yes in step S109), the control unit 103 performs control so that the portable phone 100 returns to a standby mode.

In a case where it is determined in step S105 that the control unit 103 has not received any notification signal from the detecting unit 112 (No in step S105), the control unit 103 returns to step S102 to repeat the processes.

In a case where it is determined in step S107 that the position information represents the outside of the response operation area 122 (No in step S107), the control unit 103 determines that the user has not responded to the reception of the call, the reception of the electronic mail, or the incoming of the alarm set time, and returns to step S102 to repeat the processes.

Next, an operation of the touch panel 106 will be described.

When the user brings the tip of the finger or the like into contact with the touch pad unit 106b, the touch panel 106 detects the contact position and generates the position information (the x coordinate value and the y coordinate value) representing the contact position in step S111, and then the touch panel 106 outputs the generated position information to the control unit 103 in step S112. Next, the touch panel 106 returns to step S111 to repeat the process.

The operation of the touch panel 106 in steps S111 to S112 is performed independently from the operation of the control unit 103.

(Other Modifications)

This disclosure has been described based on the above-mentioned illustrative embodiment. However, this disclosure is not limited to the above-mentioned illustrative embodiment. This disclosure also includes the following cases.

(1) The external display device 200 may be an information processing apparatus represented by a personal computer. In this case, the personal computer may include a main body unit and a display unit. The portable phone 100 transmits the position information to the main body unit of the personal computer. The main body unit receives the position information, merges an icon (a cursor having an arrow shape) representing the position, into an image to be displayed on the display unit, based on the received position information, and then outputs the image with the icon merged therein to the display unit. The display unit displays the image.

Also, the external display device 200 may be a television receiver. In this case, the portable phone 100 transmits the position information to the television receiver. The television receiver receives the position information, merges an icon (a cursor having an arrow shape) representing the position, into an image to be displayed, based on the received position information, and displays the image with the icon merged therein.

Alternatively, the external display device 200 may be a DVD player for reproducing images recorded on a DVD. In this case, the DVD player is connected to a television receiver. The portable phone 100 transmits the position information to the DVD player. The DVD player receives the position information, merges an icon (a cursor having an arrow shape) representing the position, into an image to be displayed on the television receiver, based on the received position information, and outputs the image with the icon merged therein to the television receiver. The television receiver displays the image.

(2) The portable phone 100 may be connected to the external display device 200 in a wired way by a cable in place of the antenna 109 and the short-distance wireless circuit 102, and then the portable phone 100 transmits the position information to the external display device 200 through the cable.

(3) In the above-mentioned illustrative embodiment, in a state where any notification signal is not received from the detecting unit 112, when the position information received from the touch panel 106 represents the response operation area 122, the control unit 103 invalidates the received position information, without outputting the received position information to the short-distance wireless circuit 102. However, this disclosure is not limited thereto.

In the state where any notification signal is not received from the detecting unit 112, when the position information received from the touch panel 106 represents the response operation area 122, the control unit 103 may output the received position information to the short-distance wireless circuit 102. In other words, in the state where any notification signal is not received from the detecting unit 112, any contact operation in the response operation area 122 may be considered as mouse operation, and the position information may be transmitted to the external display device 200.

(4) The touch panel 106 may display a numerical keypad in the mouse operation area 121 and output key information corresponding to key display displayed at a contact position in response to user's contact operation on the touch pad unit 106b.

(5) The Portable Phone 100 May not Include the Alarm Processing Unit 111.

(6) An Aspect of this Disclosure May be a Method as Described Above. Moreover, another aspect of this disclosure may be a computer program for implementing the above-mentioned method by a computer. Here, the computer program is created by combining a plurality of command codes representing commands to be given the computer in order to achieve predetermined functions.

Another aspect of this disclosure may be a recording medium, such as a flexible disc, a hard disc, a CD-ROM, a MO, a DVD, a DVD-ROM, a DVD-RAM, a Blu-ray Disc (BD), or a semiconductor memory, which has the above-mentioned computer program recorded thereon and is readable by a computer. Moreover, another aspect of this disclosure may be the above-mentioned computer program recorded on the above-mentioned recording medium.

Also, in another aspect of this disclosure, the above-mentioned computer program may be transmitted through a telecommunication line, a wireless or wired communication line, a network represented by the Internet, data broadcasting, or the like.

Moreover, each of the above-mentioned devices may be a computer system having a microprocessor and a memory, the memory may store the above-mentioned computer program, and the microprocessor may operate according to the above-mentioned computer program.

Also, the above-mentioned program may be recorded on the recording medium and be transferred, or may be transferred through the above-mentioned network or the like, so that the program can be executed in another independent computer system.

(7) The Above-Mentioned Illustrative Embodiment and the Above-Mentioned Modifications May be Combined in Various Forms.

The communication terminal according to this disclosure can perform control so that, in a case where the occurrence of the event is detected and then the position information output from the touch panel represents a second operation area configured to receive a response operation to respond to the event having occurred, control is performed so that an operation corresponding to the notification signal is performed. Therefore, the communication terminal according to this disclosure can suppress incorrect operation and is useful as a communication terminal having a function of designating a position on a screen of an external display device.

What is claimed is:

1. A communication terminal having a function of designating a position on a screen of an external display device, comprising:
    a touch panel, which receives a contact operation and outputs position information representing the contact position, and which includes a first operation area configured to receive a position designating operation and a second operation area configured to receive a response operation to respond to an event occurring according to an execution of another function;
    a detector, which detects occurrence of the event and outputs a notification signal;
    a controller, which determines whether the position information represents the first operation area or the second operation area;
    a transmitter, which receives the position information and transmits the received position information to the external display device; and
    a processor, which performs a process corresponding to the notification signal,
    wherein, in a case where the position information represents the first operation area, the controller outputs the received position information to the transmitting unit,
    wherein, in a case where the position information represents the second operation area and the notification signal is received, the controller controls to perform a process corresponding to the notification signal and does not output the received position information to the transmitter,
    wherein in the case where the notification signal is received, the controller outputs a message representing the occurrence of the event, and
    wherein, the touch panel displays the message in the first operation area.

2. The communication terminal according to claim 1, wherein, in a case where the position information represents the second operation area and the notification signal is not received, the controller invalidates the position information.

3. The communication terminal according to claim 1, wherein the event is reception of a call, reception of an electronic mail, or incoming of a predetermined time, the notification signal is a call reception signal representing the reception of the call, a mail reception signal representing the reception of the electronic mail, or an alarm sound representing the incoming of the predetermined time, and the processor performs a call process, an electronic mail process, or an alarm process, which are corresponding to the call reception signal, the mail reception signal, or the alarm sound, respectively.

4. A method of controlling a communication terminal, which has a function of designating a position on a screen of an external display device, and which includes a touch panel including a first operation area configured to receive a position designating operation and a second operation area configured to receive a response operation to respond to an event occurring according to an execution of another function, the method comprising;
    receiving a contact operation and outputting position information representing the contact position,
    detecting occurrence of the event and outputting a notification signal;
    determining whether the position information represents the first operation area or the second operation area;
    receiving the position information and transmitting the received position information to the external display device; and
    performing a process corresponding to the notification signal,
    wherein, in a case where the position information represents the first operation area, the received position information is outputted,
    wherein, in a case where the position information represents the second operation area and the notification signal is received, the process corresponding to the notification signal is performed and the received position information is not outputted to the transmitting unit,
    wherein in the case where the notification signal is received, a message representing the occurrence of the event is outputted, and
    wherein, the message is displayed in the first operation area.

5. A non-transitory computer-readable medium having instructions to control a communication terminal to perform a method of designating a position on a screen of an external display device, wherein the communication terminal includes a touch panel including a first operation area configured to receive a position designating operation and a second operation area configured to receive a response operation to respond to an event occurring according to an execution of another function,
    the method comprising;
    receiving a contact operation and outputting position information representing the contact position,
    detecting occurrence of the event and outputs a notification signal;
    determining whether the position information represents the first operation area or the second operation area;
    receiving the position information and transmitting the received position information to the external display device; and
    performing a process corresponding to the notification signal,
    wherein, in a case where the position information represents the first operation area, the received position information is outputted,
    wherein, in a case where the position information represents the second operation area and the notification signal is received, the process corresponding to the notification signal is performed and the received position information is not outputted to the transmitting unit, wherein in the case where the notification signal is received, a message representing the occurrence of the event is outputted, and wherein, the message is displayed in the first operation area.

* * * * *